United States Patent
Greggs (10) Patent No.: US 11,148,507 B2
(45) Date of Patent: Oct. 19, 2021

(54) VEHICLE PASSENGER COMPARTMENT VENT STRUCTURE

(71) Applicant: Nissan North America, Inc., Franklin, TN (US)

(72) Inventor: Alan Greggs, Novi, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 235 days.

(21) Appl. No.: 16/375,154

(22) Filed: Apr. 4, 2019

(65) Prior Publication Data
US 2020/0317029 A1  Oct. 8, 2020

(51) Int. Cl.
*B60H 1/24* (2006.01)
*B60R 13/02* (2006.01)

(52) U.S. Cl.
CPC ............ *B60H 1/249* (2013.01); *B60H 1/244* (2013.01); *B60R 13/02* (2013.01); *B60R 2013/0287* (2013.01); *B60Y 2200/14* (2013.01)

(58) Field of Classification Search
CPC ........ B60H 1/249; B60H 1/244; B60H 1/248; B60H 1/00021; B60H 1/26; B60H 1/267; B60H 1/30; B60H 1/00242; B60R 13/02; B60R 13/0237; B60R 2013/0287; B60Y 2200/14
USPC .................................. 454/165, 120, 137, 185
See application file for complete search history.

(56) References Cited

U.S. PATENT DOCUMENTS

| | | | | |
|---|---|---|---|---|
| 2,172,944 | A * | 9/1939 | Norris ................... | B60H 1/245 454/108 |
| 5,988,145 | A | 11/1999 | Horiuchi et al. | |
| 6,279,978 | B1 * | 8/2001 | Schreyer ............... | B60H 1/247 296/190.03 |
| 6,899,381 | B1 * | 5/2005 | Fero .................... | B60R 13/0225 296/208 |
| 10,752,186 | B2 * | 8/2020 | Tier .................... | B60R 13/0815 |
| 10,759,254 | B1 * | 9/2020 | Gallagher .......... | B62D 33/0273 |
| 2005/0225121 | A1 * | 10/2005 | Schoemann .......... | B60H 1/244 296/208 |
| 2008/0066480 | A1 | 3/2008 | Kamiyama et al. | |
| 2008/0076344 | A1 * | 3/2008 | Flowerday ............ | B60H 1/249 454/162 |
| 2008/0115517 | A1 | 5/2008 | Tacey et al. | |
| 2009/0217608 | A1 * | 9/2009 | Braun ................... | B60H 1/245 52/302.1 |

(Continued)

FOREIGN PATENT DOCUMENTS

WO   WO-2013175842 A1 *  11/2013  ............. B62D 25/04

*Primary Examiner* — Steven B McAllister
*Assistant Examiner* — Charles R Brawner
(74) *Attorney, Agent, or Firm* — Global IP Counselors, LLP (57) ABSTRACT

A vehicle passenger compartment vent structure that includes a rear wall structure, a drafter vent assembly, a baffle and a trim panel. The rear wall structure defines a rearward area of a passenger compartment of a vehicle. The rear wall structure defines at least one vent opening. The drafter vent assembly is installed to the rear wall structure covering the at least one vent opening. The baffle is installed to the rear wall structure adjacent to the drafter vent assembly and is configured to dampen sound from the drafter vent assembly. The trim panel is installed to the rear wall structure contacting the baffle and concealing the drafter vent assembly.

20 Claims, 9 Drawing Sheets

(56) References Cited

U.S. PATENT DOCUMENTS

| | | | |
|---|---|---|---|
| 2010/0064602 A1* | 3/2010 | Moore | E04D 13/178 |
| | | | 52/95 |
| 2010/0276220 A1* | 11/2010 | Kubota | B60L 3/0046 |
| | | | 180/68.1 |
| 2013/0068440 A1 | 3/2013 | Kamiyama | |
| 2016/0052367 A1* | 2/2016 | Quinn | B60R 13/0212 |
| | | | 454/138 |
| 2018/0072132 A1* | 3/2018 | Waldner | B60H 1/244 |
| 2019/0084501 A1* | 3/2019 | Salazar Prieto | B60R 13/0815 |
| 2020/0114731 A1* | 4/2020 | Sturza | B60H 1/246 |
| 2020/0247216 A1* | 8/2020 | Cho | B32B 3/266 |
| 2020/0269652 A1* | 8/2020 | Gallagher | B60H 1/00564 |
| 2020/0307357 A1* | 10/2020 | Nguyen | B60H 1/26 |
| 2020/0317028 A1* | 10/2020 | Shaw | B60R 13/0275 |

* cited by examiner

VEHICLE PASSENGER COMPARTMENT VENT STRUCTURE

BACKGROUND

Field of the Invention

The present invention generally relates to a vehicle passenger compartment vent structure. More specifically, the present invention relates to vehicle passenger compartment vent structure that includes a baffle installed adjacent to a drafter vent assembly directing air flow thereto, positioned and configured to reduce road related noise from being transmitted to the passenger compartment of a vehicle.

Background Information

Vehicle structures that define a passenger compartment with a heating and air conditioning system typically include drafter vents near the rear of the passenger compartment. Such drafter vents allow air blown into a passenger compartment to vent to outside the passenger compartment. Such drafter vents are necessary to prevent pressurization of the passenger compartment and to make is easier to open and close vehicle doors.

SUMMARY

One object of the present disclosure is to provide a vehicle with a vent structure that minimizes noise that travels through a drafter vent assembly and enters a passenger compartment.

Another object of the present disclosure is to provide a vehicle with an air flow path from a rear area of a passenger compartment to a drafter vent assembly where air within the passenger compartment can exhaust from the passenger compartment.

In view of the state of the known technology, one aspect of the present disclosure is to provide a vehicle passenger compartment vent structure with a rear wall structure, a drafter vent assembly, a baffle and a trim panel. The rear wall structure defines a rearward area of a passenger compartment of a vehicle. The rear wall structure further defines at least one vent opening. The drafter vent assembly is installed to the rear wall structure covering the at least one vent opening. The baffle is installed to the rear wall structure adjacent to the drafter vent assembly and configured to dampen sound from the drafter vent assembly. The trim panel is installed to the rear wall structure contacting the baffle and concealing the drafter vent assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
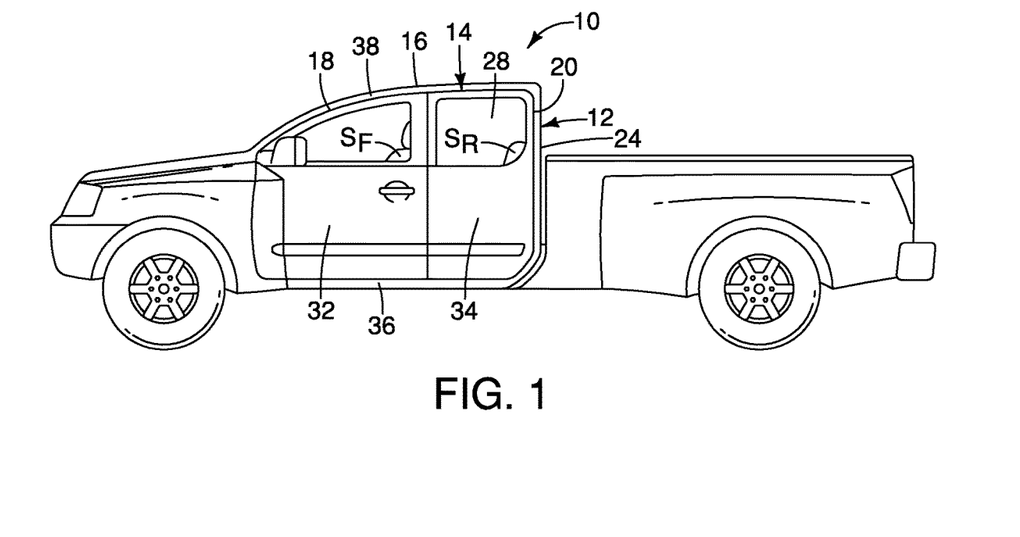
FIG. 1 is a side view of a vehicle with a vehicle body structure that includes a passenger compartment vent structure in accordance with an exemplary embodiment.

Referring initially to FIG. 1, a vehicle 10 with a vehicle passenger compartment vent structure 12 (FIG. 2) is illustrated in accordance with a first embodiment.

As shown in FIG. 1, the vehicle 10 is a pick-up truck sometimes referred to as a King Cab truck. It should be understood from the drawings and the description herein that the vehicle 10 can be any of a variety of vehicle designs, such as, for example, an SUV (sports utility vehicle), a crew-cab pick-up truck or a van.

The vehicle 10 includes a vehicle body structure 14. As shown in FIGS. 1-4, the vehicle body structure 14 includes a roof structure 16, A-pillars 18 (only one shown), C-pillars 20, a floor 22 and a rear wall structure 24. The roof structure 16, the A-pillars 18, the C-pillars 20, the floor 22 and the rear wall structure 24 define a passenger compartment 28. The roof structure 16, the A-pillars 18 and the C-pillars 20 define door openings 30 that receive front doors 32 (only one shown in FIG. 1) and rear doors 34 (only one shown in FIG. 1). In the depicted embodiment, the vehicle body structure 14 does not include B-pillars. Rather, the rear doors 34 include latch mechanisms that engage respective sills 36 and roof rails 38 below and above the door openings 30. The front doors 32 include latch mechanisms (not shown) that engage the rear doors 34 and/or the sills 36 and roof rails 38, in a conventional manner. The front and rear doors 32 and 34 are common to King Cab vehicle designs, since King Cab design has become a conventional configuration. Consequently, further description of the front and rear doors 32 and 34 is omitted for the sake of brevity.

As shown in FIG. 1, front seats $S_F$ and rear seats $S_R$ are visible through windows in the front door 32 and the rear door 34. In subsequent drawings the front seats $S_F$ and the rear seats $S_R$ are removed for greater clarity of the features of the vehicle passenger compartment vent structure 12.

Figure 2:
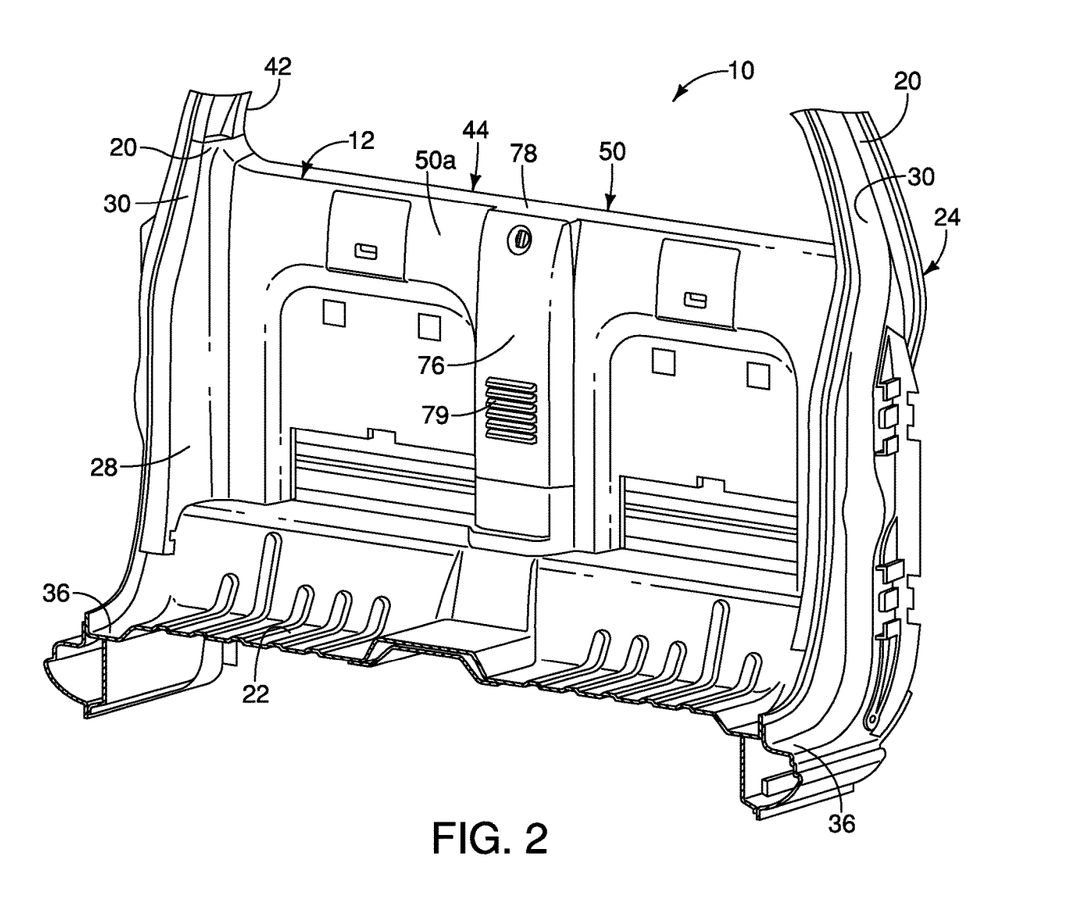
FIG. 2 is a perspective a rear wall structure of the vehicle body structure removed from the vehicle in accordance with the exemplary embodiment.
Figure 3:
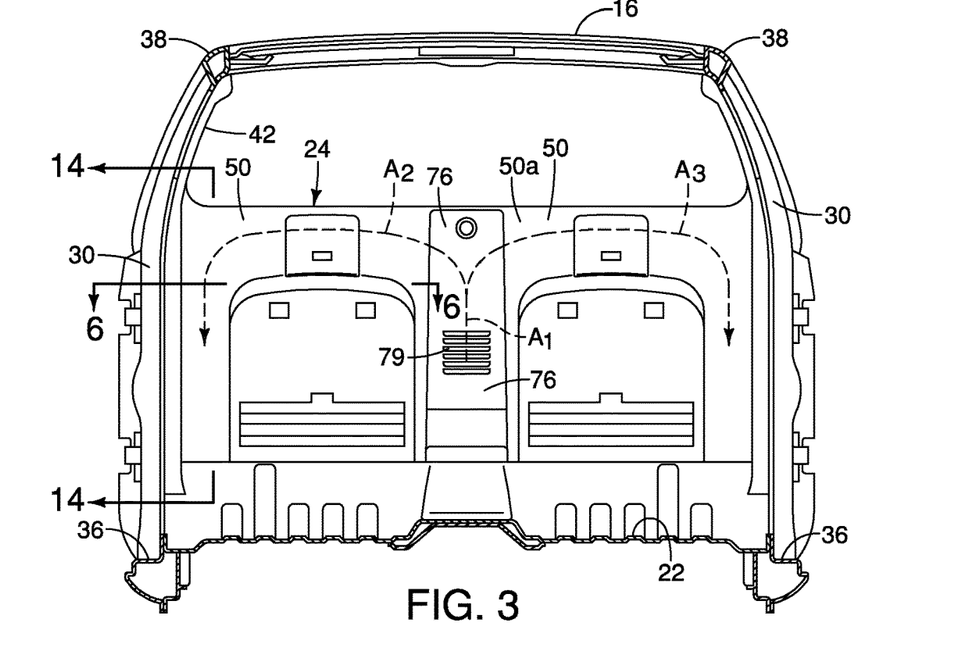
FIG. 3 is a front view of the rear wall structure depicted in FIG. 2 showing a trim surface of a rear trim panel that partially defines the passenger compartment vent structure and in accordance with the exemplary embodiment.
Figure 4:
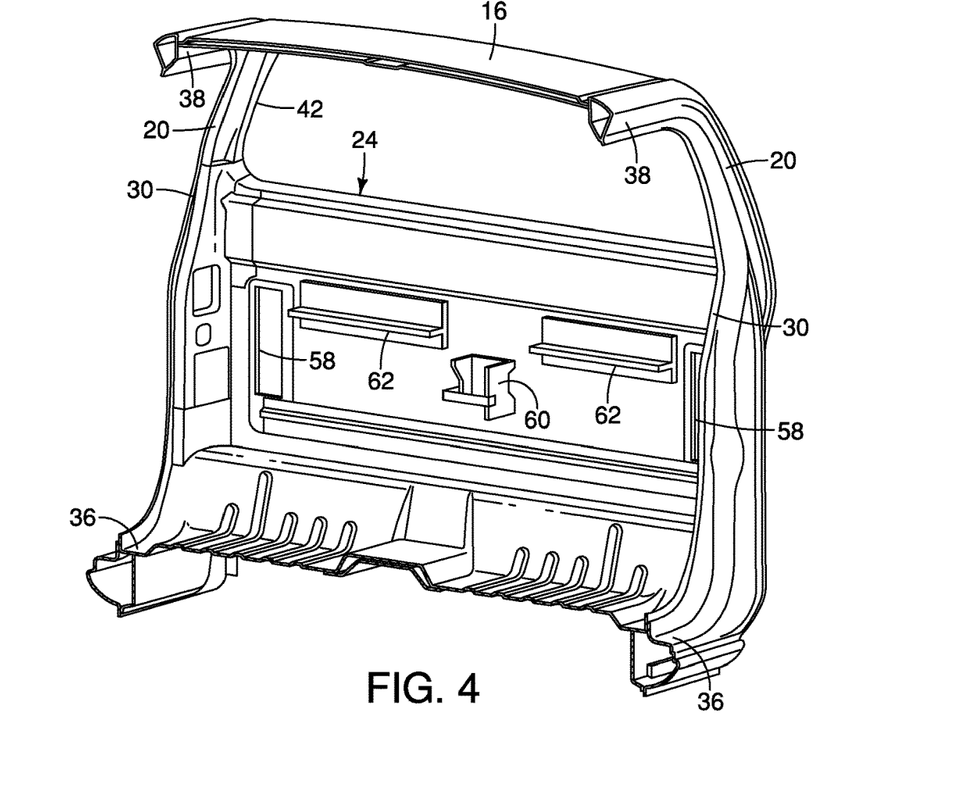
FIG. 4 is a perspective view of the rear wall structure of the vehicle body structure similar to FIG. 2 with the rear trim panel and other elements removed showing laterally extending seal structures, a tool caddy and openings dimensioned to receive drafter vent assemblies in accordance with the exemplary embodiment.

As shown in FIGS. 2, 3 and 4, the rear wall structure 24 includes an upper area that defines a rear window opening 42 and a lower area 44. The rear wall structure 24 basically defines a rearward area of the passenger compartment 28 of a vehicle 10. The rear window opening 42 is defined between the C-pillars 20, above the lower area 44 and below the roof structure 16. The floor 22 extends forward from a bottom end of the rear wall structure 24. The lower area 44 includes and partially defines the vehicle passenger compartment vent structure 12, as is described in greater detail below.

As shown in FIGS. 2 and 3, the vehicle passenger compartment vent structure 12 (hereinafter the vent structure 12) is primarily located on or adjacent to the lower area 44 of the rear wall structure 24. Specifically, the vent structure 12 is defined by features of the lower area 44 of the rear wall structure 24, features of a rear trim panel 50, drafter vent assemblies 52 and baffles 54.

Figure 5:
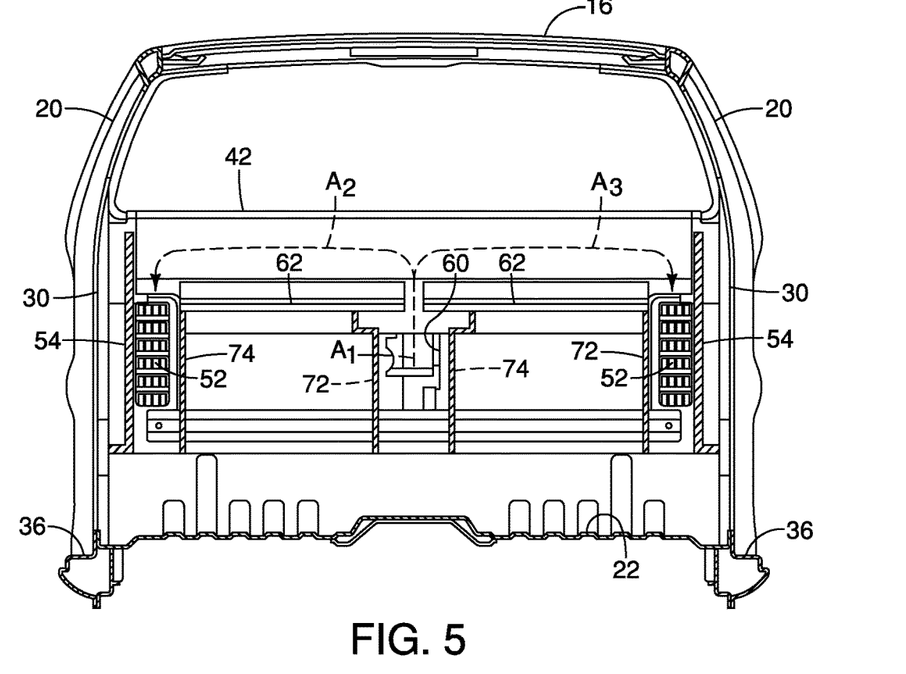
FIG. 5 is another front view of the rear wall structure similar to FIG. 3 showing the laterally extending seal structures, the tool caddy and drafter vent assemblies installed to the rear wall structure covering openings in accordance with the exemplary embodiment.
Figure 6:
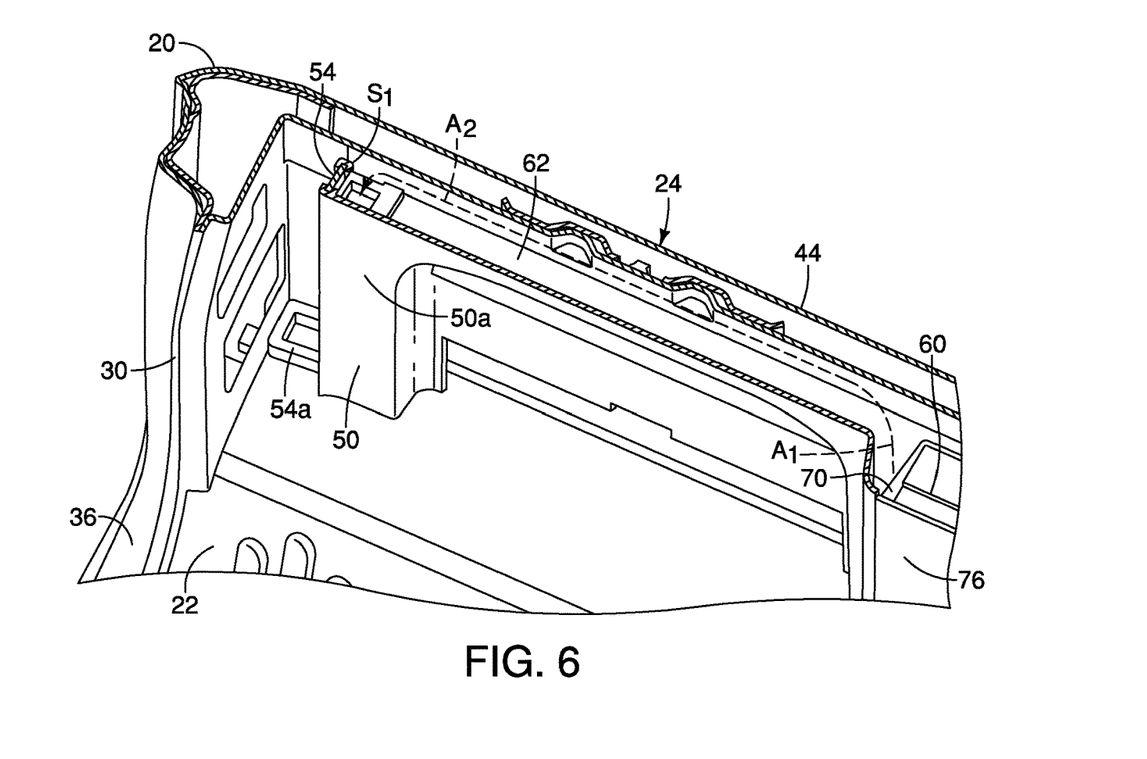
FIG. 6 is a cross-sectional view of the rear wall structure taken along the line 6-6 in FIG. 3 in accordance with the exemplary embodiment.

As shown in FIGS. 3, 4 and 5, the lower area 44 of the rear wall structure 24 extends from a lower end of the window opening 42 to the floor 22. As shown in FIGS. 2, 3 and 6, the rear trim panel 50 covers the lower area 44 of the rear wall structure 24 when fully assembled. However, as shown in FIG. 4 with the rear trim panel 50 removed, the lower area 44 includes at least one vent opening 58, and preferably two vent openings 58, a jack caddy 60 and laterally extending seals 62.

As shown in FIG. 4, the vent opening 58 extends from the passenger compartment 28 to the exterior of the vehicle body structure 14 through the rear wall structure 24. The jack caddy 60 is a conventional structure installed to the rear wall structure 24 to support a jack (not shown) for supporting and lifting the vehicle 10 in order to change a flat tire and a lug wrench (not shown). Since jack caddies, jacks and lug wrenches are conventional vehicle elements, further description is omitted of the sake of brevity.

The laterally extending seals 62 are installed to the lower area 44 of the rear wall structure 24 below and spaced apart from the window opening 42. The laterally extending seals 62 can be made of a single resilient material or can be made with a bracket portion that attaches to the rear wall structure 44 with a seal portion installed along a laterally extending forward end of the laterally extending seals 62. The laterally extending seals 62 are dimensioned such that when the trim panel 50 is installed to the rear wall structure 24, the laterally extending seals 62 contact the trim panel 50 creating an air tight seal therebetween. The laterally extending seals 62 at least partially define an air flow path (also referred to as an air outlet passageway) that includes at least three pathways $A_1$, $A_2$ and $A_3$, as explained in greater detail below.

Figure 8:
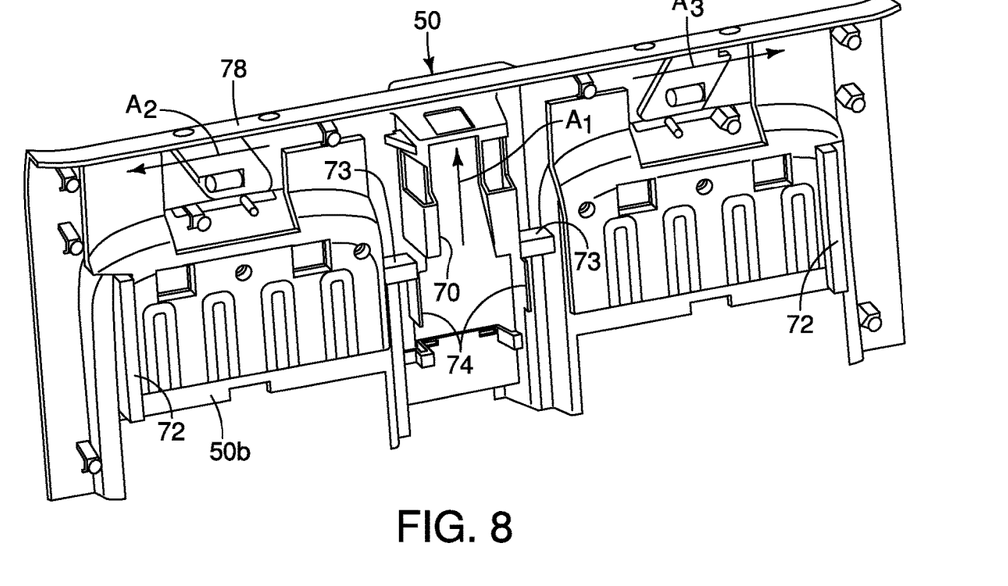
FIG. 8 is a perspective view of a rear surface of the rear trim panel removed from the rear wall structure showing a tool caddy opening and vertically extending seal structures in accordance with the exemplary embodiment.
Figure 12:
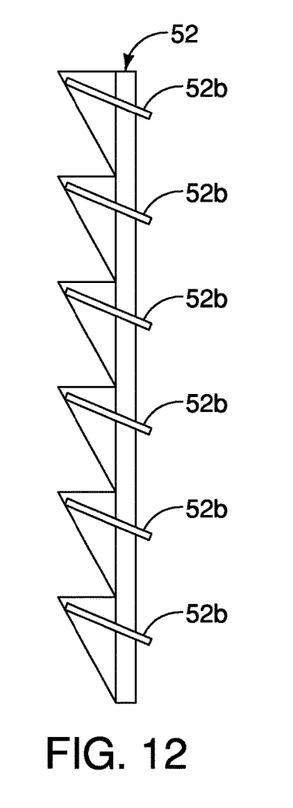
FIG. 12 is a second schematic side view of one of the drafter vent assemblies shown in a venting orientation with flaps in opened positions moved by air flowing out of the passenger compartment in accordance with the exemplary embodiment.

As shown in FIGS. 2, 3, 6, 8-10 and 14, the rear trim panel 50 includes two recessed areas that conform to overall shapes of the rear seats $S_R$ (description of the two recessed areas is omitted for the sake of brevity). The rear trim panel 50 further includes an opening 70 (FIG. 8-10), outboard baffles 72, reinforcement webs 73, inboard baffles 74 (FIGS. 5 and 8), sealing blocks 75 (FIG. 9), a removable cover 76 (FIGS. 2, 3 and 6), and an upper sealing edge 78 (FIGS. 8 and 12). The rear trim panel 50 also includes a trim surface 50a (FIGS. 2, 3, 6 and 14) that is exposed within the passenger compartment 28 and a rear surface 50b (FIGS. 8-10) that is hidden from view with the rear trim panel 50 installed to the rear wall structure 24.

The opening 70 (FIGS. 8-10) is dimensioned such that a passenger or vehicle operator can remove the removable cover 76 from the rear trim panel 50 (with the rear trim panel 50 installed to the rear wall structure 24). Once the cover 76 (also referred to as a removable access panel) is removed, the jack caddy 60 (also referred to as a tool caddy) is exposed and can be accessed. With the cover 76 installed to the rear trim panel 50, the jack caddy 60 and the tire changing tools stored thereon are concealed. As shown in FIG. 8, the rear surface 50b of the rear trim panel 50 includes the outboard baffles 72, the reinforcement webs 73 and the inboard baffles 74.

Figure 9:
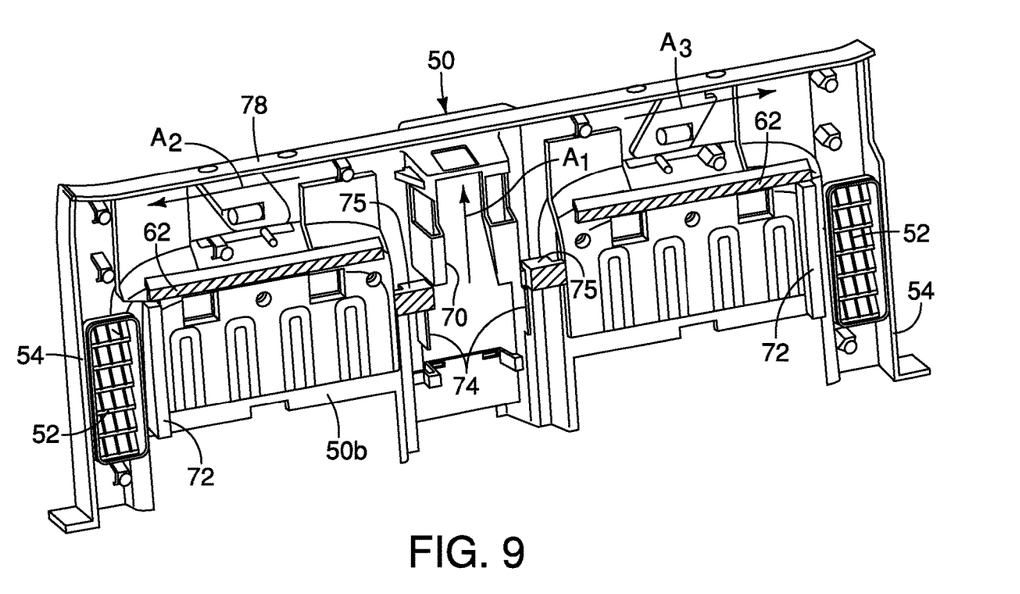
FIG. 9 is another perspective view of the rear surface of the rear trim panel with elements of the rear wall structure overlaying corresponding portions of the rear surface of the rear trim panel in accordance with the exemplary embodiment.
Figure 10:
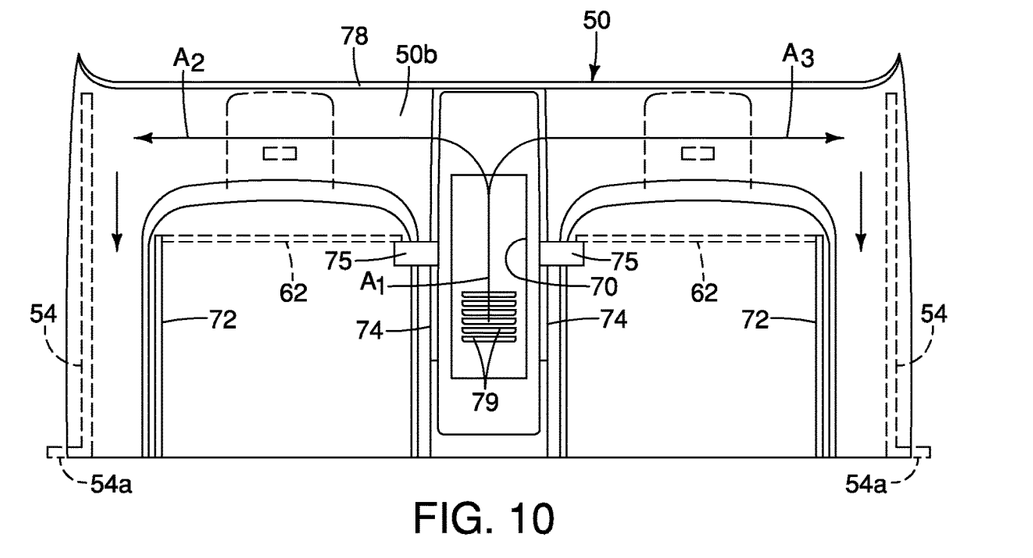
FIG. 10 is a rear view of the rear trim panel showing vertical baffle structures formed on or attached thereto that align with the pair of baffles and the laterally extending seal structures to define air flow paths to the drafter vent assemblies in accordance with the exemplary embodiment.

As shown in FIGS. 8 and 10, the outboard baffles 72 are basically flanges formed with, or alternatively, attached to the rear surface 50b of the rear trim panel 50. The outboard baffles 72 are vertically oriented and spaced apart from the adjacent lateral edge of the rear trim panel 50. As shown in FIG. 9 with elements of the rear wall structure 24 superimposed on the rear trim panel 50, the outboard baffles 72 are located inboard and adjacent to an inboard side of a corresponding one of the drafter vent assemblies 52. Like the laterally extending seals 62, distal ends of the outboard baffles 72 have thick sealing material fitted thereto. Hence, the outboard baffles 72 are also referred to as seals and sealing structures. Thus, when the rear trim panel 50 is installed to the rear wall structure 24, the sealing material on the outboard baffles 72 seals against a forward-facing surface (interior surface) of the rear wall structure 24 at least partially defining the pathways $A_2$ and $A_3$ of the air flow path.

As shown in FIG. 8, the reinforcement webs 73 are optional structures that stiffen the central portion of the trim panel 50 in the area s on either side of the opening 70. The reinforcement webs 73 are preferably integrally formed with the trim panel 50. As shown in FIG. 9, the sealing blocks 75 (one for each of the reinforcement webs 73) are placed on and/or adhered to the reinforcement webs 73. Alternatively, the sealing blocks 75 can be installed to the rear wall structure 24 in locations that overlap with and/or align with the reinforcement webs 73. In the depicted embodiment, the sealing blocks 75 are fixed to the reinforcement webs 73 and contact the rear wall structure 24 with the trim panel 50 installed to the rear wall structure 24. Contact between the rear wall structure 24 and the sealing blocks 75 creates an air seal there between. The inboard baffles 74 are located below respective ones of the reinforcement webs 73 and include seals installed to distal ends thereof. Further, the inboard baffles 74 are located on opposite sides of the opening 70. With the trim panel 50 installed to the rear wall structure 24, the inboard baffles 74 also contact the rear wall structure 24 creating an air seal therebetween.

The upper sealing edge 78 can be provided with a sealing material (not shown) and attachment fasteners (not shown). Consequently, the rear trim panel 50 can be installed to the rear wall structure 24 and fixed in place in a conventional manner with fasteners. Once the rear trim panel 50 is installed to the rear wall structure 24, as shown in FIG. 12, the upper sealing edge 78 contacts the rear wall structure 24 and creates an air seal therebetween.

The cover 76 includes vent openings 79 as shown in FIGS. 2, 3 and 10). The vent openings 79 are louvred vent openings, and define the beginning of the airflow pathway, and more specifically, the pathway $A_1$. In other words, when an air conditioning/heating system of the vehicle is operating, air pressure within the passenger compartment 28 increases, the air pressure is relieved with air flowing out of the passenger compartment 28 through the vent openings 79 in the cover 76 and into the pathway $A_1$. FIGS. 3, 5 and 10 show the general directions of air flow of the pathways $A_1$, $A_2$ and $A_3$. When air conditioning or heat is being provided to the passenger compartment 28 in a non-recirculating mode with fresh air being cooled or heated, the blower motor (not shown) moves air into the passenger compartment 28. In order to prevent an excessive or undesirable amount of air pressure within the passenger compartment 28, air moves through the vent openings 79 and into the air flow path defined between the rear trim panel 50 and the rear wall structure 24.

The first pathway $A_1$ is defined between the rear trim panel 50 and the rear wall structure 24 and further defined between the inboard baffles 74 and the sealing blocks 75. The inboard baffles 72 and the sealing blocks 75 guide air upward over and around the jack caddy 60 toward the pathways $A_2$ and $A_3$. The pathway $A_2$ starts in a central area behind the trim panel 50 above the pathway $A_1$ and is further defined below the upper sealing edge 78 of the trim panel 50 and a corresponding one of the laterally extending seals 62. Once the exhausting air from the passenger compartment 28, a portion of the air moves through pathway $A_1$ and then in a first outboard lateral direction into the pathway $A_2$ defined the upper sealing edge 78 and the corresponding one of the laterally extending seals 62. Similarly, another portion of the air flow from the pathway $A_1$ moves in a second outboard lateral direction into the pathway $A_3$, as shown in FIGS. 3, 5 and 10. The exhausting air from each of the pathways $A_2$ and $A_3$ then moves downward toward and exhausting out a corresponding one of the drafter vent assemblies 52.

In the embodiment of the vehicle 10 shown in the drawings, there are two drafter vent assemblies 52. Since the drafter vent assemblies 52 are identical, description of one applies equally to both. Therefore, for the sake of brevity, only one of the drafter vent assemblies 52 is described hereinbelow.

The drafter vent assembly 52 is installed to the rear wall structure 24 covering and aligning with a corresponding one of the vent openings 58. The drafter vent assembly 52 includes an outer frame with a plurality of openings 52a with a corresponding number of flaps 52b. The flaps 52b are also referred to hereinbelow as vent doors 52b. Each of the flaps 52b pivot about an upper pivot pin, as shown in FIGS. 9 and 10. When air pressure within the passenger compartment 28 is approximately the same (or less) that the air pressure outside the vehicle 10, the flaps 52b move to the closed orientations shown in FIG. 9. When air pressure within the passenger compartment 28 increases to a level above the air pressure outside the vehicle 10, the flaps 52b move to the open orientations shown in FIG. 10 allowing air from the air flow paths $A_1$ and $A_2$ (from the passenger compartment 28) to exhaust through the openings 52a of the drafter vent assembly 52 (and the vent openings 58).

Figure 7:
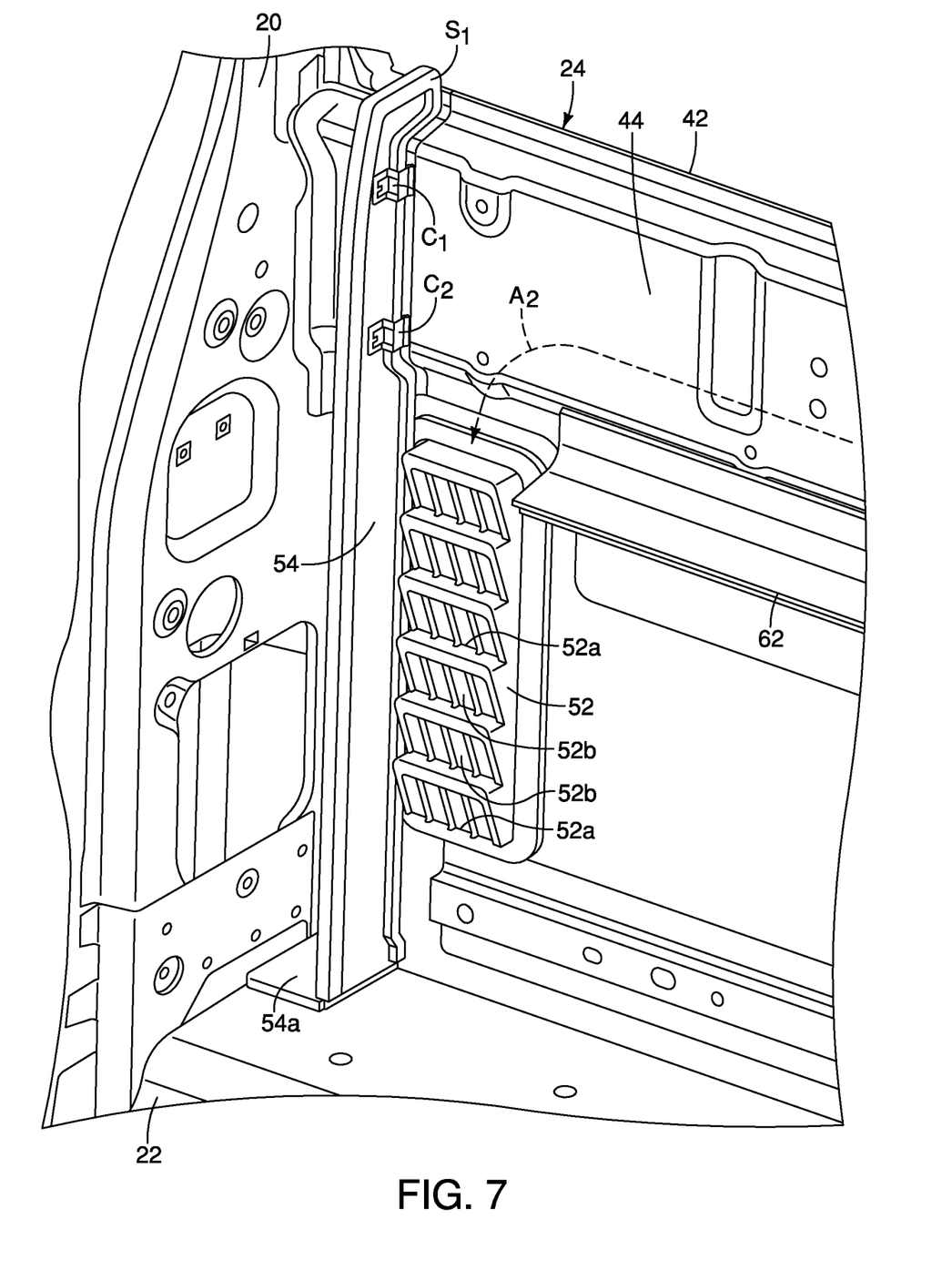
FIG. 7 is a perspective view of a rear corner of the rear wall structure with the rear trim panel removed showing one of the drafter vent assemblies and one of a pair of baffles adjacent to the one of the drafter vent assemblies in accordance with the exemplary embodiment.
Figure 11:
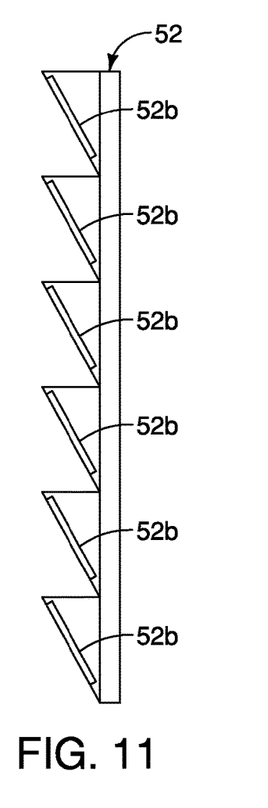
FIG. 11 is a first schematic side view of one of the drafter vent assemblies shown in a non-venting orientation with flaps in closed positions in accordance with the exemplary embodiment.

As shown in FIGS. 5, 7 and 11, the drafter vent assembly 52 is vertically oriented and is in contact with and abuts the adjacent one of the baffles 54, as is explained further below. With the rear trim panel 50 installed to the rear wall structure 24, the drafter vent assembly 52 and the adjacent one of the baffles 54 is concealed by the rear trim panel 50.

There are two baffles 54 installed to the rear wall structure 24. Since the baffles 54 are basically identical (mirror images of one another), only one baffle 54 is described herein below for the sake of brevity.

A description of one of the baffles 54 is now provided with specific reference to FIGS. 5-7, 11-16. The baffle 54 is installed to the rear wall structure 24 adjacent to the drafter vent assembly 52. The baffle 54 is positioned and configured to dampen sound from outside the vehicle 10 that can enter the vehicle 10 via the drafter vent assembly 52. In other words, one of the purposes of the baffle 54 is to dampen, reduce and possibly eliminate noise coming though the drafter vent assembly 52 and entering the passenger compartment 28.

Figure 13:
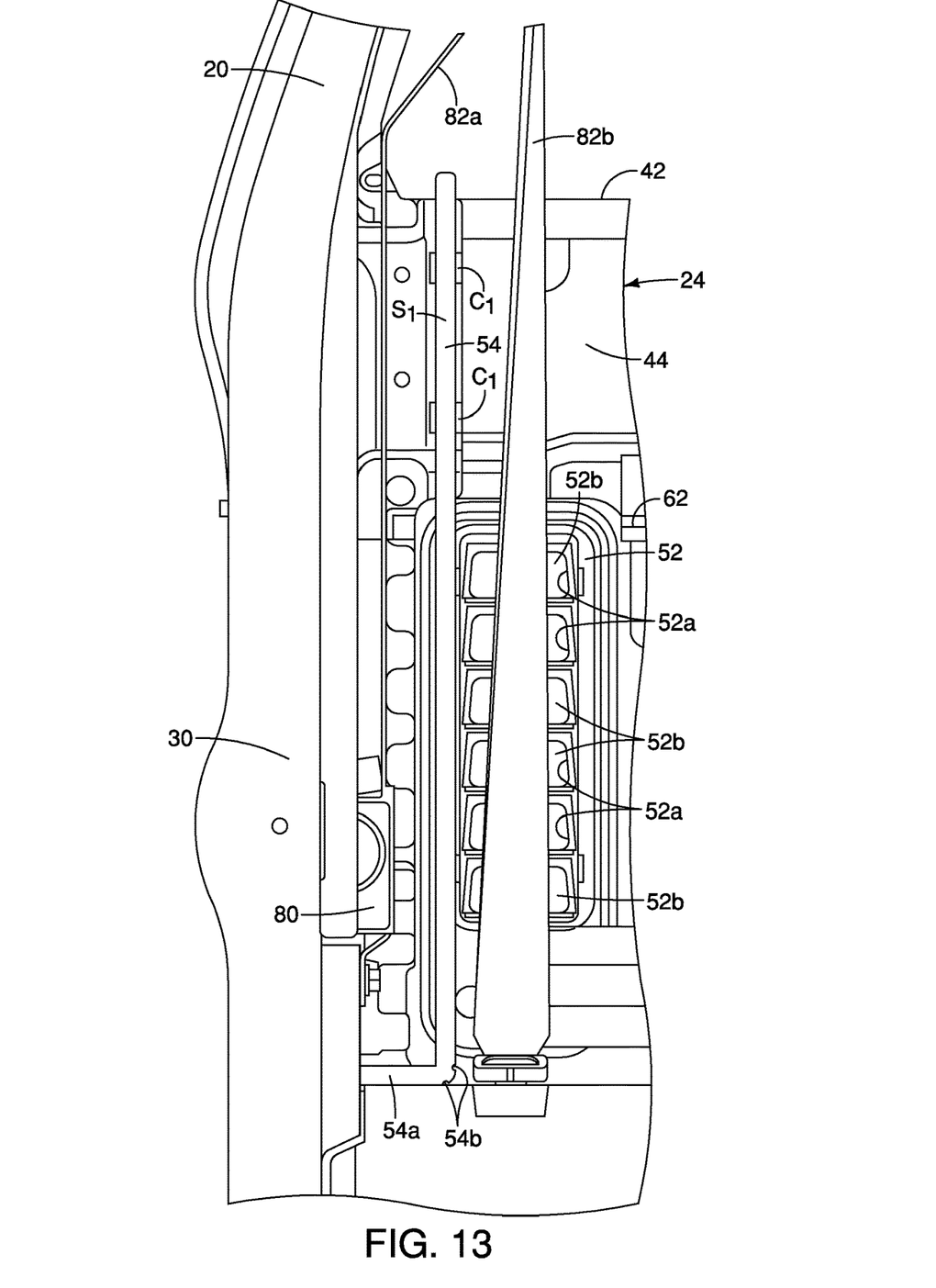
FIG. 13 is a front view of the rear wall structure with the rear trim panel removed showing one of the baffles installed adjacent to the drafter vent assembly with a bent portion of the baffle contacting a side wall surface thereby retaining the baffle in position adjacent to the drafter vent assembly in accordance with the exemplary embodiment.
Figure 14:
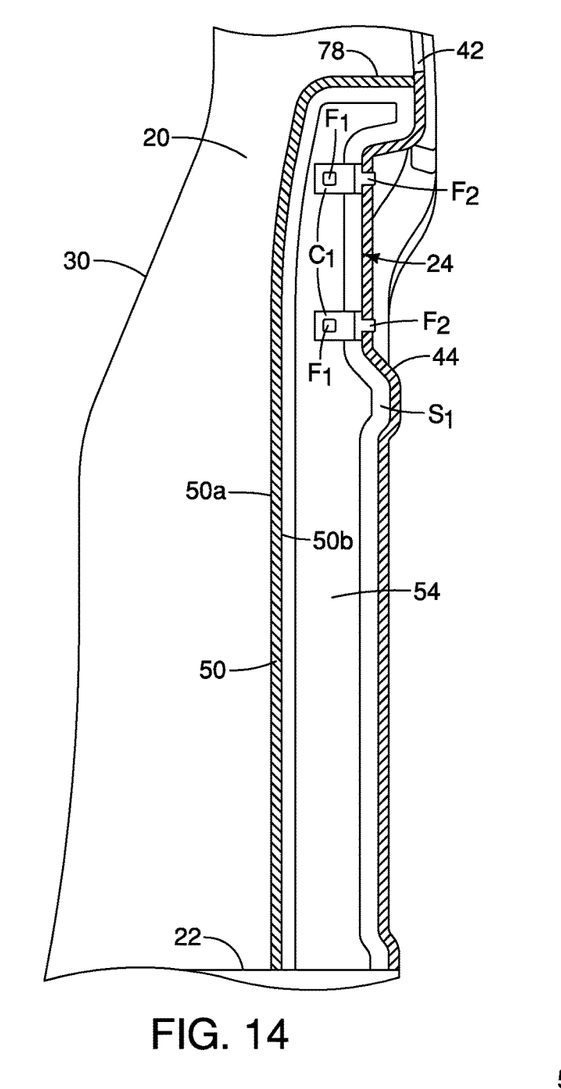
FIG. 14 is a cross-sectional view taken along the line 14-14 in FIG. 3 showing the baffle attached to the rear wall structure via attachment clips and the upper end contacting the rear wall structure sealing an upper end of the air flow path in accordance with the exemplary embodiment.
Figure 15:
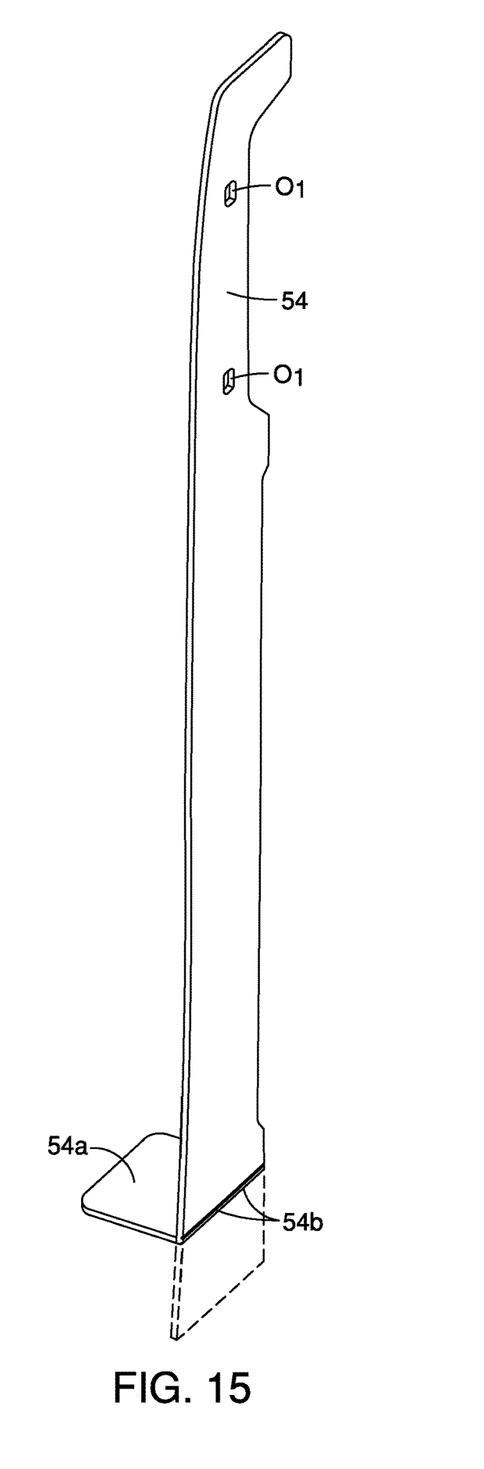
FIG. 15 is a perspective view of the baffle with seal material removed showing a lower portion thereof with two scores that facilitate bending of a bent portion of the baffle in a bent orientation (solid lines) and an un-bent orientation (phantom lines) in accordance with the exemplary embodiment.
Figures 16, 17, 18:
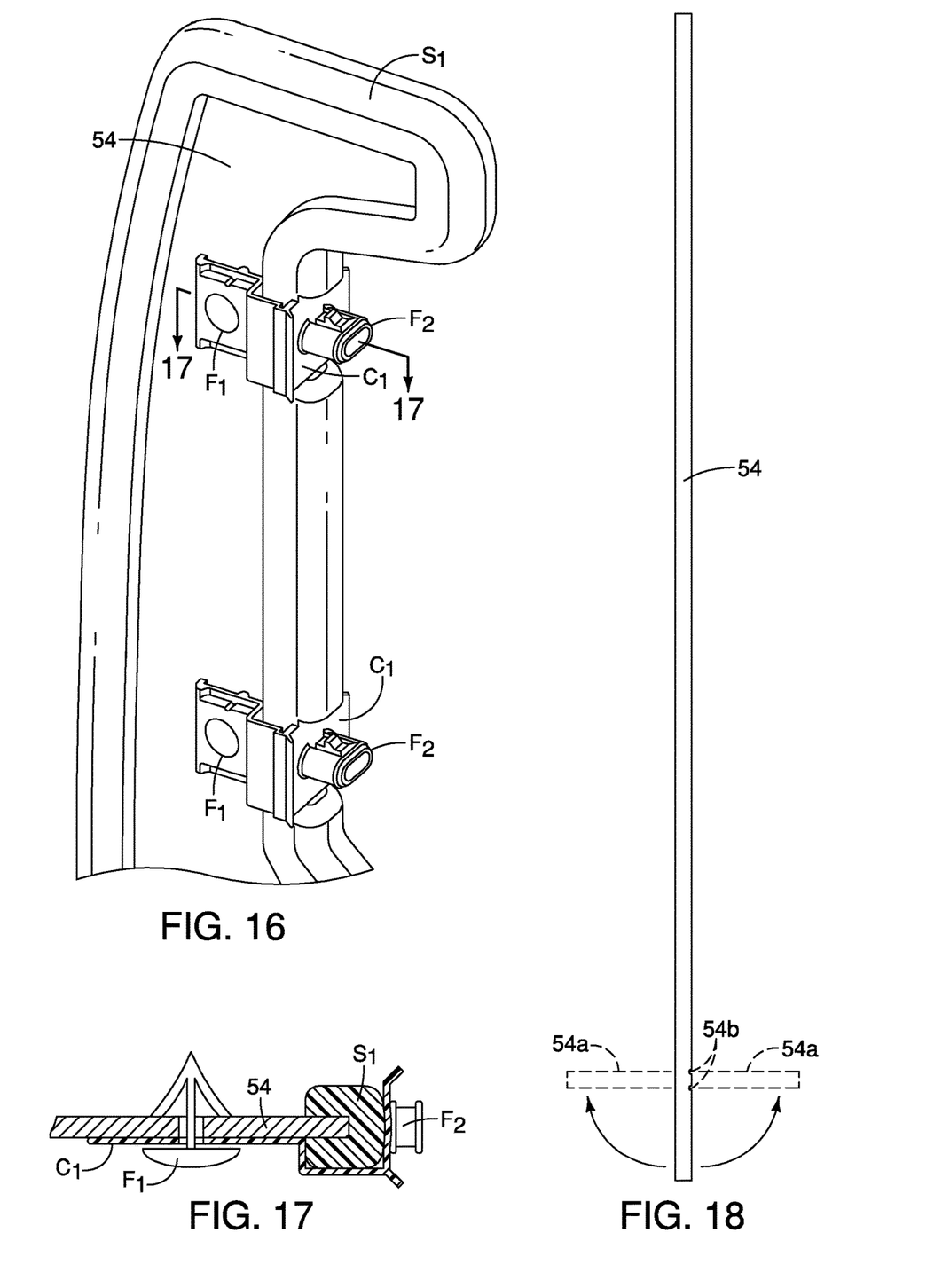
FIG. 16 is a perspective view of the baffle showing details of the attachment clips attached thereto in accordance with the exemplary embodiment.
FIG. 17 is a cross-sectional view of the baffle taken along the line 17-17 in FIG. 16 showing further details of one of the attachment clips attached to the baffle in accordance with the exemplary embodiment.
FIG. 18 is an end view of the baffle with the seal material and the clips removed showing the bent portion of the baffle folded in either of two different bent orientations in accordance with the exemplary embodiment.

As shown in FIGS. 12, 14 and 15, the baffle 54 is basically a plate member that can be formed from plastic materials, polymer materials, or any other suitable lightweight material. In the depicted embodiment, the baffle 54 is made of a corrugated plastic material that resembles cardboard material. As shown in FIGS. 13 and 16, the baffle 54 includes a pair of score lines 54b that define a bending area such that a bent portion 54a can be formed by bending the baffle 54 along the pair of score lines 54b. A score line, such as a scratch or incision, is typically made with a sharp instrument in the surface of the material of the baffle 54. The pair of score lines 54b are positioned such that the bent portion 54a (regardless of the direction of bending) has a predetermined length, within predetermined tolerances.

As shown in FIG. 8 in phantom lines, the bent portion 54a of the baffle 54 at the left side of FIG. 8 is bent to the left. The bent portion 54a of the baffle 54 at the right side of FIG. 8 is bent to the right. The bent portion 54a is dimensioned (via the score lines 54b)

As shown in FIG. 7, the bent portion 54a contacts a lower surface of the C-pillar 20 adjacent to the floor 22. The contact between the bent portion 54a restricts movement of the lower end of the baffle 54 in an outboard direction. Otherwise, the baffle 54 is vertically oriented (upright) and is perpendicular to an interior surface of the rear wall structure 24. As shown in FIGS. 6 and 12, the baffle 54 contacts both the rear trim panel 50 and the rear wall structure 24, being confined therebetween. Hence, the baffle 54 defines an outboard side of the air flow path $A_1$ in the area of the drafter vent assembly 52. It should be understood that on the opposite lateral side of the rear wall structure 24, the baffle 54 defines an outboard side of the air flow path $A_2$ in the area of the other of the two drafter vent assemblies 52.

As shown in FIGS. 6, 12, 14 and 15, the baffle 54 includes a seal member $S_1$ that extends at least part way around an outer periphery of the baffle 54. As shown in FIG. 12, the seal member $S_1$ extends along the entire forward, top and rearward outer periphery of the baffle 54. Consequently, the seal member $S_1$ of the baffle 54 contacts the interior surface of the rear wall structure 24 and a rearward facing surface of the rear trim panel 50 creating a seal therebetween to prevent movement of air and sound.

As shown in FIGS. 5, 11 and 12, the seal member $S_1$ of the baffle 54 contacts the adjacent interior side surface of the C-pillar 20 and bent portion 54a (also referred to as the bottom flap) positions the main body to contact an outboard edge of the drafter vent assembly 52.

The baffle 54 also includes a pair of attachment clips $C_1$ that attach to the baffle 54 via fasteners $F_1$, as shown in FIG. 15. As shown in FIGS. 14 and 15, the attachment clips $C_1$ include a curved projection dimensioned to curve around adjacent portions of the seal member $S_1$. The curved projection of the attachment clips $C_1$ includes two fastener portions $F_2$, as shown in FIGS. 11-12 and 14-15. The fastener portions $F_2$ are inserted into corresponding openings in the rear wall structure 24, fixing the baffle 54 to the rear wall structure 24, as shown in Figures.

As shown in FIGS. 2 and 3, a side trim panel of the C-pillar 20 is installed to the C-pillar 20 in a conventional manner, concealing a gap visible in FIG. 6 between an outboard end of the rear trim panel 50 and the C-pillar 20. As shown in FIG. 11 with the rear trim panel 50 removed, a seatbelt mechanism 80 is installed to the C-pillar 20. A first portion 82a of a seatbelt extends upwardly forward of the drafter bent assembly 52. A second portion 82b of the seatbelt extends downward and is fixed to the floor 22. The seal $S_1$ of the baffle 54 is visible behind the seatbelt portions 82a and 82b.

The vehicle components of the vehicle 10, other than various elements of the vent structure 12, are conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle passenger compartment vent structure. Accordingly, these terms, as utilized to describe the present invention should be interpreted relative to a vehicle equipped with the vehicle passenger compartment vent structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle passenger compartment vent structure, comprising:
   a rear wall structure that defines a rearward area of a passenger compartment of a vehicle, the rear wall structure defining at least one vent opening;
   a floor having an elevated floor portion, the floor extending in a forward direction from the rear wall structure;
   a drafter vent assembly installed to the rear wall structure covering the at least one vent opening;
   a baffle installed to the rear wall structure adjacent to the drafter vent assembly and configured to dampen sound from the drafter vent assembly, the baffle extending downward along the rear wall structure to the floor such that the baffle contacts the floor; and
   a trim panel installed to the rear wall structure contacting the baffle and concealing the drafter vent assembly.

2. The vehicle passenger compartment vent structure according to claim 1, wherein
   the baffle is vertically oriented and is perpendicular to an interior surface of the rear wall structure.

3. The vehicle passenger compartment vent structure according to claim 2, wherein
   the drafter vent assembly is vertically oriented with the baffle abutting an outboard edge of the drafter vent assembly.

4. The vehicle passenger compartment vent structure according to claim 1, wherein
the drafter vent assembly is vertically oriented with the baffle abutting an outboard edge of the drafter vent assembly.

5. The vehicle passenger compartment vent structure according to claim 1, wherein
the baffle includes a seal member that extends at least part way around an outer periphery of the baffle such that the seal member contacts an interior surface of the rear wall structure and a rearward facing surface of the trim panel.

6. The vehicle passenger compartment vent structure according to claim 1, wherein
the baffle has a first surface and a second surface opposite the first surface, the first surface having at least one horizontally oriented score on the first surface thereof, the score defining a fold line.

7. The vehicle passenger compartment vent structure according to claim 6, wherein
the baffle includes a main body and a bottom flap that is formed by bending the baffle along the fold line.

8. The vehicle passenger compartment vent structure according to claim 1, wherein
the baffle includes a main body and a bottom flap, the main body extending along the rear wall structure and the bottom flap contacting an adjacent interior side surface that partially defines the passenger compartment such that the bottom flap positions the main body to contact the drafter vent assembly.

9. The vehicle passenger compartment vent structure according to claim 1, wherein
the baffle includes a main body and a bottom flap that is formed by bending the baffle along a fold line defined thereon.

10. A vehicle passenger compartment vent structure, comprising:
a rear wall structure that defines a rearward area of a passenger compartment of a vehicle, the rear wall structure defining at least one vent opening;
a drafter vent assembly installed to the rear wall structure covering the at least one vent opening;
a trim panel installed to the rear wall structure concealing the drafter vent assembly, the trim panel and the rear wall structure further defining an air outlet passageway shaped to vent air from within the passenger compartment of the vehicle and out of the at least one vent opening; and
a baffle having a main body and a bottom flap, the main body being vertically oriented and installed to the rear wall structure adjacent to the drafter vent assembly such that the trim panel contacts the baffle and further defines the air outlet passageway, the bottom flap being horizontally oriented and contacting an adjacent interior side surface that partially defines the passenger compartment such that the bottom flap positions the main body to contact the drafter vent assembly, the baffle being configured to dampen sound from outside the passenger compartment entering through the drafter vent assembly.

11. The vehicle passenger compartment vent structure according to claim 10, wherein
the drafter vent assembly includes a plurality of vent doors that opens in response to movement of air exiting the passenger compartment and closes in the absence of movement of air exiting the passenger compartment thereby preventing entry of air outside the vehicle into the passenger compartment through the drafter vent assembly.

12. The vehicle passenger compartment vent structure according to claim 10, wherein
the main body of the baffle is perpendicular to an interior surface of the rear wall structure.

13. The vehicle passenger compartment vent structure according to claim 12, wherein
the drafter vent assembly is vertically oriented with the main body of the baffle abutting an outboard edge of the drafter vent assembly.

14. The vehicle passenger compartment vent structure according to claim 10, wherein
the drafter vent assembly is vertically oriented with the main body of the baffle abutting an outboard edge of the drafter vent assembly.

15. The vehicle passenger compartment vent structure according to claim 10, wherein
the baffle includes a seal member that extends at least part way around an outer periphery of the main body of the baffle such that the seal member contacts an interior surface of the rear wall structure and a rearward facing surface of the trim panel.

16. The vehicle passenger compartment vent structure according to claim 10, wherein
the baffle has a first surface and a second surface opposite the first surface, the first surface having at least one horizontally oriented score on the first surface thereof, the score defining a fold line.

17. The vehicle passenger compartment vent structure according to claim 16, wherein
the main body and the bottom flap are formed by bending the baffle along the fold line.

18. The vehicle passenger compartment vent structure according to claim 10, wherein
the main body and the bottom flap are formed by bending the baffle along a fold line defined thereon.

19. A vehicle passenger compartment vent structure, comprising:
a rear wall structure that defines a rearward area of a passenger compartment of a vehicle, the rear wall structure defining at least one vent opening;
a floor having an elevated floor portion, the floor extending in a forward direction from the rear wall structure;
a drafter vent assembly installed to the rear wall structure covering the at least one vent opening;
a trim panel installed to the rear wall structure concealing the drafter vent assembly, the trim panel and the rear wall structure further defining an air outlet passageway shaped to vent air from within the passenger compartment of the vehicle and out of the at least one vent opening; and
a baffle having a main body and a bottom flap, the main body being upright and installed to the rear wall structure adjacent to the drafter vent assembly such that the trim panel contacts the baffle and further defines the air outlet passageway, the bottom flap being horizontally oriented and extending along a portion of the floor, the baffle being configured to dampen sound from outside the passenger compartment entering through the drafter vent assembly.

20. The vehicle passenger compartment vent structure according to claim 19, wherein
the bottom flap of the baffle contacts an adjacent interior side surface that partially defines the passenger compartment such that the bottom flap positions the main body to contact the drafter vent assembly.

\* \* \* \* \*